United States Patent
Kneer

(12) 
(10) Patent No.: US 6,244,852 B1
(45) Date of Patent: Jun. 12, 2001

(54) METHOD OF PRODUCING A RECEPTACLE AND A RECEPTACLE HAVING PRESSURE COMPENSATING OPENINGS

(75) Inventor: Roland Kneer, Farchant (DE)

(73) Assignee: Gaplast GmbH (DE)

( * ) Notice: Subject to any disclaimer, the term of this patent is extended or adjusted under 35 U.S.C. 154(b) by 0 days.

(21) Appl. No.: 09/214,253

(22) PCT Filed: Jun. 19, 1997

(86) PCT No.: PCT/DE97/01250

§ 371 Date: Dec. 30, 1998

§ 102(e) Date: Dec. 30, 1998

(87) PCT Pub. No.: WO98/01268

PCT Pub. Date: Jan. 15, 1998

(30) Foreign Application Priority Data

Jul. 4, 1996 (DE) .............................. 196 26 967

(51) Int. Cl.⁷ ................................................. B29C 49/62

(52) U.S. Cl. ......................... 425/522; 425/523; 425/531; 425/812; 264/523

(58) Field of Search ....................... 200/487.07; 425/522, 425/523, 527, 531, 812; 264/526, 523

(56) References Cited

U.S. PATENT DOCUMENTS

| | | | |
|---|---|---|---|
| 3,322,869 | * 5/1967 | Scott, Jr. | 425/523 X |
| 3,457,337 | * 7/1969 | Turner | 425/523 |
| 4,550,043 | * 10/1985 | Beck | 215/12.2 |
| 4,609,516 | * 9/1986 | Krishnakumar et al. | 264/255 |
| 4,966,543 | * 10/1990 | Suppayan et al. . | |

FOREIGN PATENT DOCUMENTS

| | | | |
|---|---|---|---|
| 0182094 | * | 5/1986 | (EP) . |
| 0532873 | * | 3/1993 | (EP) . |
| 0550772 | * | 7/1993 | (EP) . |
| 0759399 | * | 2/1997 | (EP) . |
| WO92/12926 | * | 8/1992 | (WO) . |

* cited by examiner

Primary Examiner—Joseph M. Moy
(74) Attorney, Agent, or Firm—Pyle & Piontek

(57) ABSTRACT

The receptacle is produced in a coextrusion-type blow molding process and consists of a stiff outer receptacle and an easily deformable inner bag which are made from respectively different thermoplastic materials that do not form a welded joint with one another. The bottom of the receptacle includes a welded seam in the area of which the welded seam of the inner bag is clamped. Pressure compensating openings are formed in the outer receptacle by the measures that a notch is cut in, except for a small residual wall thickness, and that the residual wall section is torn open by applying a force.

9 Claims, 1 Drawing Sheet

Figure 1:
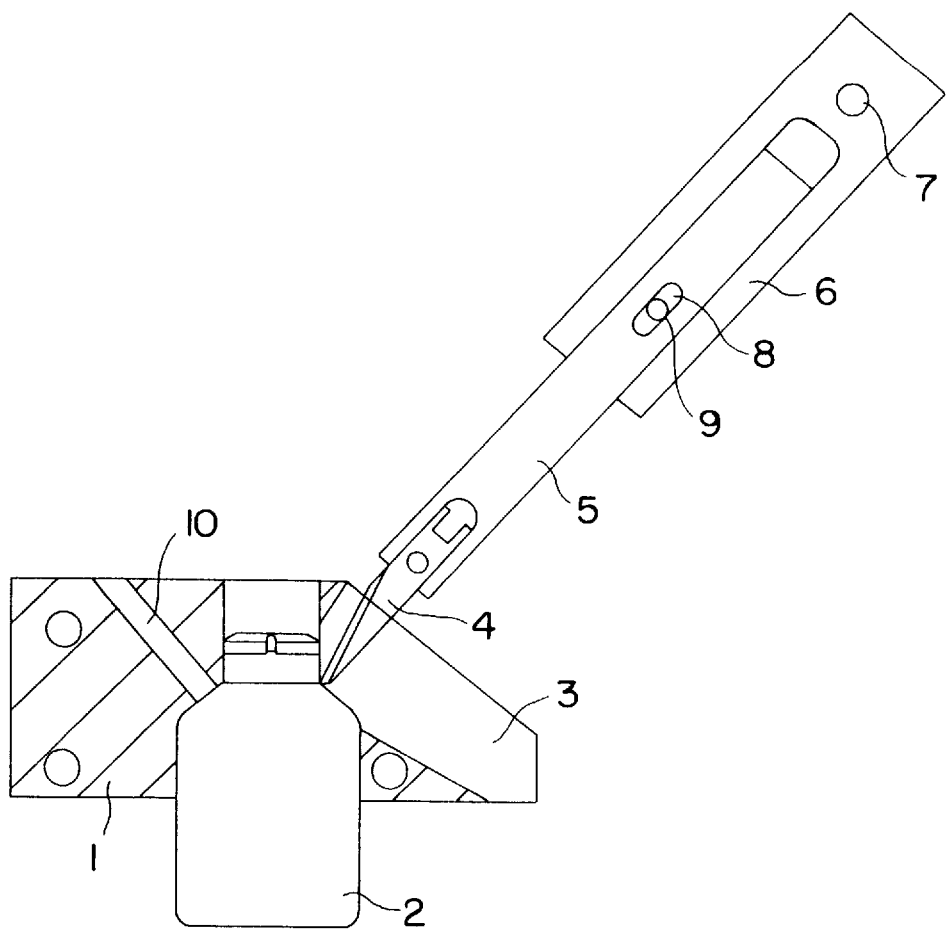

METHOD OF PRODUCING A RECEPTACLE AND A RECEPTACLE HAVING PRESSURE COMPENSATING OPENINGS

The present invention relates to a method of producing a receptacle consisting of a substantially stiff outer receptacle and an easily deformable inner bag which are made from respectively different thermoplastic materials that do not form a welded joint with one another, said receptacle comprising a receptacle opening and at least one wall opening provided in the outer receptacle, through which pressure is compensated in the area between the inner bag and the outer receptacle, with a parison, which consists of at least two tubings, being coextruded and arranged between the opened halves of a blow mold, the blow mold being closed when said parison has reached the length required for producing the receptacle, the bottom area of the receptacle to be produced having formed therein an outwardly projecting web made of welded material of said outer receptacle, in which web the welded bottom seam of the inner bag is clamped and held in axial direction, and the parison being inflated by a pressure medium for contact with the wall of the blow mold and removed from the blow mold. Furthermore, the present invention relates to such receptacles whose at least one pressure compensating opening is formed in a special manner.

A method of the type in question is disclosed in DE 41 39 555 C2. The closed and at least partly welded bottom seam of the outer receptacle is formed by shaping the squeeze area of the blow mold at the bottom side in a special manner, with excess material being squeezed off and material of the outer receptacle being united at both sides to form a web of kite-shaped cross-section from which the welded bottom seam of the inner receptacle slightly recedes towards the interior of the receptacle due to the impact pressure built up in the cavity forming the web, so that the material of the outer receptacle is welded together over part of the web. The weld seam of the inner bag is clamped in the area positioned thereabove. The projecting web provided at the bottom of the outer receptacle may also have a different cross-sectional shape, for instance an arched shape.

As for the formation of the welded bottom seam of the outer receptacle and the clamping of the weld seam of the inner bag provided at the bottom side, explicit reference is here made to the content disclosed in DE 41 39 555 C2.

A pump for discharging the receptacle contents received in the inner bag may be provided on the receptacle opening of the receptacle of the type in question. However, the receptacle may also be a squeeze-type receptacle in the case of which the outer receptacle is squeezed together by hand to subsequently assume its initial shape again.

In the receptacle which is known from DE 41 39 555 C2, pressure compensation which becomes necessary due to a decrease in volume of the inner bag, which has been caused by the discharge of the receptacle contents, is carried out with the aid of unwelded shoulder seams of the outer receptacle which are formed in that the coextruded blank has a diameter which is greater than the neck portion of the blow mold, so that the blank is squeezed off in the shoulder portion and on the neck of the receptacle to be produced when the blow mold is closed for eliminating excess material. This is done without the formation of an outwardly projecting web as in the case of the bottom seam so that, during the smooth squeeze-off operation in the squeeze area of the shoulder portion and of the neck portion, material of the inner bag remains between the spaced-apart material of the outer receptacle, so that the last-mentioned material cannot be welded together, since the material of the inner bag does not recede. Hence, a closed weld seam is formed on the inner bag and ensures a leakage-proof inner bag, and air can enter through the shoulder seams of the outer receptacle, which is open at both sides, from the surrounding atmosphere for pressure compensation.

This configuration has the disadvantage that, starting from the open shoulder seams of the outer receptacle, the receptacle consists of two shells which rest on one another in a substantially loose manner. When the receptacle is equipped with a pump and when the pump is put on the two neck halves in a slightly inclined manner, the two shells may get slightly displaced relative to one another, whereby a step is formed on the upper edge, as a result of which the receptacle is no longer leakproof, since even a rubber insert provided at this place could not compensate for the resulting unevenness. Moreover, only receptacles with shoulder sections can be provided in the known manner with the open pressure compensating seams, whereas in the case of so-called wide-necked vessels, which are devoid of any shoulder sections, no pressure compensating openings can be formed in this way.

It is the object of the present invention to provide a method of producing pressure compensating openings in the wall of the outer receptacle in the case of receptacles of the type under consideration without any leakage problems arising therefrom on the receptacle opening. The method is meant to be also applicable to so-called wide-necked vessels.

It is also an object to indicate a receptacle which includes pressure compensating openings in its outer receptacle without the above-mentioned drawbacks being observed.

These objects are achieved with the features of patent claim 1.

Advantageous developments of the present invention are characterized in the dependent claims.

According to the present invention the wall openings of the outer receptacle are formed subsequent to the blow molding process in that at least one, preferably two or even more openings are cut, punched, punctured or pierced into the wall of the outer receptacle in a mechanical manner, or, however, are cut in by laser, with an inner wall section possibly remaining unaffected at the beginning to prevent damage to the adjacent inner bag in a reliable manner. The reason for this is that certain tolerances of the wall thickness of the outer receptacle are unavoidable and that in practice there are no measuring methods in the present case for measuring the respective wall thickness with an extremely great accuracy so as to guarantee a complete mechanical severing through the wall of the outer receptacle and to ensure full protection of the inner bag against the cutting operation, etc. According to the invention the remaining inner wall section is then broken open or torn up by applying a force. The inner bag cannot be damaged thereby.

In a development of the present invention, the measure which is taken in a first method consists in that the at least one wall opening, preferably two (or even more) wall openings are formed in that a cut or notch is cut or punched into the wall of the outer receptacle or is formed by means of a laser, said cut or notch penetrating through the wall except for a small residual wall section, and that the residual wall section is opened by applying a force.

This cutting or punching process takes place in a preferably non-cutting manner with a sharp knife or a punching tool or by means of a laser, so that no particles detach that would have to be sucked off if a possible contamination was to be ruled out. However, it is also within the scope of the present invention that a small amount of wall material can be cut away if, for instance, a slightly larger wall opening is desired for faster pressure compensation. The necessary pressure compensation, however, is already accomplished— though at a slightly slower pace—through a capillary-like opening, as is e.g. created by a smooth cut.

For performing the method, an apparatus according to the invention may be used which includes a clamping block which at least partly encloses the finished blown receptacle, which has preferably already cooled down. The clamping block may have formed therein a slot which extends up to the receptacle wall and has a knife projecting thereinto, with the knife being pivotably held outside the clamping block. When the knife is being pivoted by a drive means, the knife tip performs such a circular movement that it cuts a notch into the receptacle wall, with the notch extending through the wall of the outer receptacle, except for a small wall thickness left for safety reasons. For instance, when the outer receptacle has a wall thickness of from 0.7 mm to 0.9 mm, there remains preferably an uncut wall section of 0.2 mm. The outer receptacle may e.g. consist of polypropylene without the invention, however, being limited thereto.

Furthermore, the apparatus of the invention may include a through hole which leads up to the receiving chamber of the receptacle and through which a breaking ram may be advanced for breaking up the residual wall section. To this end the receptacle should be turned in the receiving opening of the clamping block in such a manner that the breaking ram impinges on one side of the notch or the cut when being pushed forwards by the application of an advance force. As a consequence, the very thin residual wall section will break open or will be torn up, whereby a pressure compensating opening is formed in the receptacle wall. The cutting operation and the breaking of the opening may also be carried out in one step by joining knife and breaking ram to obtain one unit and by jointly pivoting said members, with the breaking ram impinging on the outer receptacle wall.

The pressure compensating openings can be formed at any desired place of the outer wall, and the respective receptacle need not include shoulder sections to this end. This means that wide-necked vessels can also be provided with pressure compensating openings in the inventive manner.

The residual wall section, which has been left for safety reasons, can be broken open or torn up not only by applying a force of pressure to one side of the cut opening, but there are also many other possibilities of opening the thin residual wall.

According to the present invention the pressure compensating openings can also be formed in that in the blow molding process at least one, preferably two or more bulging portions are formed with an inner indented portion in the wall of the outer receptacle, and that the bulging portions are cut off, preferably again with the exception of a small residual wall section left for safety reasons, with the residual wall section being then opened by applying a force. The bulging portions may be small ribs or, for instance, dome-shaped projections which are created by corresponding recesses formed in the wall of the blow mold. The indented portion, i.e. the inner wall of the outer receptacle, is preferably withdrawn inwards relative to the outer wall which surrounds the bulging portion, namely by the residual safety wall thickness, e.g. by 0.2 mm which will remain when the bulging portion is cut off such that the residual wall section is in alignment with the surrounding outer wall. Of course, the removal of the bulging portion is not limited to a single cutting operation; rather, the bulging portion may also be removed, for instance, by milling or grinding. The residual wall section which has been left for safety reasons can then be opened again by applying a force.

According to a further feature which is suggested in the present invention, the at least one pressure-compensating wall opening can also be formed by puncturing or piercing the wall of the outer receptacle, with a medium being blown or sprayed against the wall of the inner receptacle after the wall has been fully cut through. This medium should be under such a high pressure that the inner bag is lifted to a sufficient degree from the outer receptacle, i.e., it is pressed inwards to ensure that the inner bag is not injured by the puncturing or piercing needle which has been pushed or pierced through the wall of the outer receptacle. This can be accomplished in that the puncturing or piercing needle has a central channel which communicates with the source of the medium, so that at the moment when the puncturing or piercing needle passes through the wall the pressure medium is blown or sprayed through the tip of the needle against the wall of the inner bag. The medium may, e.g., be water, air or a gel.

In the wall of the stiff outer receptacle, the receptacle of the invention comprises at least one, preferably two or more pressure-compensating openings which are either partly cut or punched into the wall of the outer receptacle and are then torn up, or which are formed by puncturing or piercing the outer wall. Hence, as far as the receptacle is concerned, unwelded seam points which on the receptacle neck might lead to leakage problems in the case of the receptacle discussed above with respect to the prior art are not found on the outer receptacle.

The production method of the invention makes it possible that the coextruded blank has a diameter which is smaller than the diameter of the receptacle neck, because no excess material has to be squeezed off in the shoulder portion for forming unwelded outer-receptacle seams. This, in turn, makes it possible that in the bottom area the squeeze seam has a length smaller than the diameter of the receptacle to be produced.

Essential components of an apparatus are described in the following text in a largely diagrammatic manner for carrying out the steps of the invention regarding the formation of pressure-compensating openings in the wall of a receptacle produced in the coextrusion-type blow molding process.

Figure 2:
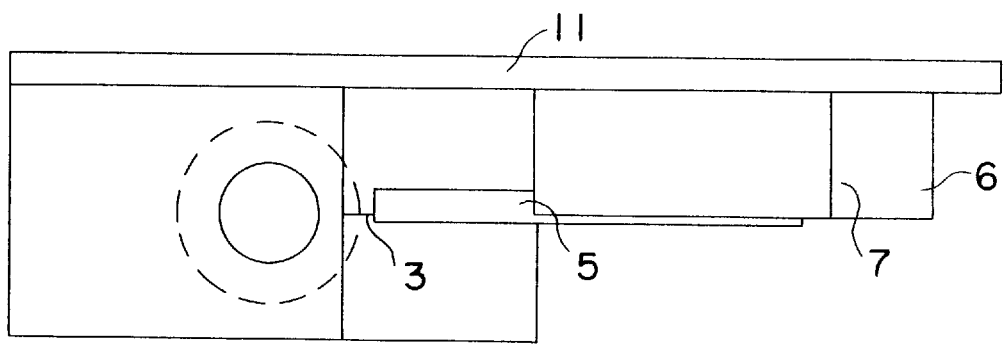

FIG. 1 is a largely schematic side view showing essential components of the apparatus; and FIG. 2 is a top view on the apparatus according to FIG. 1.

A clamping block 1 includes a receiving chamber which matches the outer contour of the upper part of a receptacle 2 which has been produced in a coextrusion-type blow molding process. The receptacle 2 is introduced from below into the cavity of the clamping block and, although this is not shown in the figures, it is fixed therein by a holding device.

The clamping block 1 has formed therein a slot 3 which terminates in the cavity and has a knife blade 4 projecting thereinto, the knife blade 4 being secured to a knife holder 5 which, in turn, is held by a pivot arm 6. The pivot arm is rotatable about an axis 7, namely by means of a drive device (not shown).

The tip of the knife blade 4 is pivoted along such a radius that a cut is made in the shoulder portion of the receptacle 2 through the wall of the outer receptacle, with the cut cutting through the wall, except for a small wall thickness left for safety reasons. To adjust the radius of the knife blade, the knife holder 5 is secured over a selected length to the pivot arm 6; for this purpose the knife holder may, e.g., be provided with an elongated hole 8 through which a fastening screw 9 extends.

It goes without saying that the cut or notch provided in the wall of the outer receptacle can be made at any desired point of the peripheral wall, or also of the bottom, and that the receptacle need not have a shoulder portion for this purpose.

Moreover, the clamping block 1 contains a through hole 10 which leads into the receptacle receiving chamber and through which a breaking ram (not shown) can be advanced against the receptacle wall. To this end, the receptacle 2 is turned in the receptacle receiving chamber to such an extent that the through hole 10 terminates directly laterally next to the cut or notch. The breaking ram is vigorously pressed by means of an advancing device (not shown) against the receptacle wall, whereby the thin wall section, which has been left for safety reasons, bursts open.

FIG. 2 shows that the clamping block 1 and the pivotable knife assembly can be mounted on a joint frame 11.

When preferably two pressure compensating openings are formed in the wall of the outer receptacle, the inner bag is removed from the outer receptacle by applying a vacuum to the receptacle opening for avoiding any adhesion between inner bag and outer receptacle. The inner bag is here expediently subjected to a leakage test. The inner bag is then again placed on the outer receptacle by applying excess pressure, so that the receptacle is ready to receive the contents intended for the receptacle.

What is claimed is:

1. A method of producing a receptacle consisting of a substantially stiff outer receptacle and an easily deformable inner bag which are made from respectively different thermoplastic materials that do not form a welded joint with one another, said receptacle comprising a receptacle opening and at least one wall opening provided in the outer receptacle, through which pressure is compensated in the area between the inner bag and the outer receptacle, with a parison, which consists of at least two tubings, being coextruded and arranged between the opened halves of a blow mold, the blow mold being closed when said parison has reached the length required for producing said receptacle, excess material being squeezed off in the bottom area of the receptacle to be produced, and an outwardly projecting web made of welded material of said outer receptacle being formed, in which web the welded bottom seam of the inner bag is clamped and held in axial direction, and said parison being inflated by a pressure medium for contact with the wall of the blow mold and removed from said blow mold, characterized in that said at least one wall opening is formed in that a cut or a notch is cut or punched into the wall of said outer receptacle to penetrate through the wall, except for a small residual wall section, and that said residual wall section is opened by applying a force.

2. A method according to claim 1, characterized in that said punching or cutting operation is performed in a non-cutting manner.

3. A method of producing a receptacle consisting of a substantially stiff outer receptacle and an easily deformable inner bag which are made from respectively different thermoplastic materials that do not form a welded joint with one another, said receptacle comprising a receptacle opening and at least one wall opening provided in the outer receptacle, through which pressure is compensated in the area between the inner bag and the outer receptacle, with a parison, which consists of at least two tubings, being coextruded and arranged between the opened halves of a blow mold, the blow mold being closed when said parison has reached the length required for producing said receptacle, with excess material being squeezed off in the bottom area of the receptacle to be produced, and an outwardly projecting web made of welded material of said outer receptacle being formed, in which web the welded bottom seam of the inner bag is clamped and held in axial direction, and said parison being inflated by a pressure medium for contact with the wall of the blow mold and removed from said blow mold, characterized in that said at least one wall opening is formed in that a small bulging portion is formed with an inner indented portion in the wall of said outer receptacle, and that said bulging portion is cut off or removed, except for a small residual wall section, and said residual wall section is opened by applying a force.

4. A method according to any one of claims 1 to 3, characterized in that said residual wall section is torn open.

5. A method according to claim 3, characterized in that the wall is pressed inwards at one side of said notch or cut.

6. A method according to claim 3, characterized in that said bulging portion is cut off in such a manner that the residual wall section is in alignment with the surrounding outer wall.

7. A method of producing a receptacle consisting of a substantially stiff outer receptacle and an easily deformable inner bag which are made from respectively different thermoplastic materials that do not form a welded joint with one another, said receptacle comprising a receptacle opening and at least one wall opening provided in the outer receptacle, through which pressure is compensated in the area between the inner bag and the outer receptacle, with a parison, which consists of at least two tubings, being coextruded and arranged between the opened halves of a blow mold, the blow mold being closed when said parison has reached the length required for producing said receptacle, with excess material being squeezed off in the bottom area of the receptacle to be produced, and an outwardly projecting web made of welded material of said outer receptacle being formed, in which web the welded bottom seam of the inner bag is clamped and held in axial direction, and said parison being inflated by a pressure medium for contact with the wall of the blow mold and removed from said blow mold, characerized in that said at least one wall opening is formed in that the wall of said outer receptacle is punctured or pierced, and that, when the wall of said outer receptacle has been fully penetrated, a medium is blown or sprayed against the wall of said inner bag.

8. A method according to claim 7, characterized in that said medium is blown or sprayed through a hole of a puncturing needle or a piercing means.

9. A method according to claim 7 or 8, characterized in that said medium is air, water or a gel.

* * * * *